(12) United States Patent
Jiang et al.

(10) Patent No.: US 11,741,636 B2
(45) Date of Patent: Aug. 29, 2023

(54) IMAGE PROCESSING DEVICE AND IMAGE PROCESSING METHOD THEREOF

(71) Applicant: Novatek Microelectronics Corp., Hsinchu (TW)

(72) Inventors: Hui-Yu Jiang, Hsinchu (TW); Heng-Yao Lin, Tainan (TW); Yen-Tao Liao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 441 days.

(21) Appl. No.: 16/987,410

(22) Filed: Aug. 7, 2020

(65) Prior Publication Data

US 2022/0044447 A1    Feb. 10, 2022

(51) Int. Cl.
*G06T 9/20* (2006.01)
*G06T 5/00* (2006.01)
*G06T 5/50* (2006.01)

(52) U.S. Cl.
CPC .............. *G06T 9/20* (2013.01); *G06T 5/002* (2013.01); *G06T 5/009* (2013.01); *G06T 5/50* (2013.01); *G06T 2207/20192* (2013.01)

(58) Field of Classification Search
CPC ........... G06T 9/20; G06T 5/002; G06T 5/009; G06T 5/50; G06T 2207/20192; G06T 2207/20021; G06T 5/008; H04N 19/117; H04N 19/14; H04N 19/176; H04N 19/85
See application file for complete search history.

(56) References Cited

U.S. PATENT DOCUMENTS

| | | | | |
|---|---|---|---|---|
| 6,606,093 B1 * | 8/2003 | Gossett | ................. | G06T 11/203 345/589 |
| 7,755,649 B2 * | 7/2010 | Brown Elliott | .......... | G09G 5/02 345/643 |

* cited by examiner

*Primary Examiner* — Phuoc Tran
(74) *Attorney, Agent, or Firm* — JCIPRNET

(57) ABSTRACT

An image processing method including the following steps is provided. An image information of an image is received, wherein the image includes a plurality of blocks and the image information includes a plurality of pixel information of each block. A dual gamma correction is performed on a first group of blocks of the image to obtain one or more corrected blocks and the dual gamma correction is skipped on a second group of blocks of the image to obtain a plurality of uncorrected blocks. A first encoding process is performed on the one or more corrected blocks to obtain a plurality of first encoded blocks. A second encoding process different from the first encoding process is performed on the plurality of uncorrected blocks to obtain a plurality of second encoded blocks.

15 Claims, 9 Drawing Sheets

IMAGE PROCESSING DEVICE AND IMAGE PROCESSING METHOD THEREOF

BACKGROUND

Technical Field

The disclosure relates to an image processing device and an image processing method thereof, and in particular to an image processing device and an image processing method for dual gamma correction.

Description of Related Art

Compared with images viewed by the user from the front of the display panel, the images viewed by the user from the side of the display panel have deviations in terms of shape and color. The above issue is caused by the liquid crystal itself, such as the limitation of viewing angle. In order to reduce the impact of the above issue, the color of pixels is usually disturbed by the dual gamma correction. For example, multiple subpixels in a pixel are respectively corrected with a high gamma curve and a low gamma curve, and different gamma voltages are applied to achieve the difference for the gray scale, so that the pixel values of adjacent subpixels is different.

However, in a compression process, since the difference between pixel information of adjacent subpixels is relatively large, the compression efficiency is relatively poor and the degree of distortion is relatively high. In order to improve the compression efficiency and reduce the degree of distortion, a mapping process is usually performed before the compression process, such that the pixel information with similar characteristics are gathered before performing the compression process. However, after the dual gamma correction, the edge constituted by multiple edge pixels (which are pixels with very different pixel information from neighboring pixels, such as a black line in the display screen) in the display screen may disappear. In addition, the characteristics of pixels in an edge block should be remained, so performing the mapping process on the edge pixels makes no sense.

SUMMARY

The disclosure provides an image processing device and an image processing method thereof, which can improve reconstructed image quality by processing the edge texture separately in compression.

The image processing method according to the disclosure includes the following steps. An image information of an image is received, wherein the image includes multiple blocks and the image information includes multiple pixel information of each block. A dual gamma correction is performed on a first group of blocks of the image to obtain one or more corrected blocks and the dual gamma correction is skipped on a second group of blocks of the image to obtain multiple uncorrected blocks. A first encoding process is performed on the one or more corrected blocks to obtain multiple first encoded blocks. A second encoding process different from the first encoding process is performed on the multiple uncorrected blocks to obtain multiple second encoded blocks. The disclosure also provides a corresponding image processing device.

The image processing method according to the disclosure includes the following steps. An encoded image information of an encoded image is received, wherein the encoded image includes multiple encoded blocks and each encoded block is assigned with a first indication signal or a second indication signal. A first decoding process is performed on the encoded blocks assigned with the first indication signal to generate multiple first decoded blocks. A second decoding process different from the first decoding process is performed on the encoded blocks assigned with the second indication signal to generate multiple second decoded blocks. An image information is reconstructed according to the first decoded blocks and the second decoded blocks.

The image processing device according to the disclosure includes an image processing circuit and an image encoding circuit. The image processing circuit is configured to: receive an image information of an image, wherein the image includes multiple blocks and the image information includes multiple pixel information of each block; and perform a dual gamma correction on a first group of blocks of the image to obtain one or more corrected blocks and skip the dual gamma correction on a second group of blocks of the image to obtain multiple uncorrected blocks. The image encoding circuit is configured to: perform a first encoding process on the one or more corrected blocks to obtain multiple first encoded blocks; and perform a second encoding process different from the first encoding process on the multiple uncorrected blocks to obtain multiple second encoded blocks.

The image processing device according to the disclosure includes a receiving circuit, a decoding circuit, and an image processing circuit. The receiving circuit is configured to receive an encoded image information of an encoded image, wherein the encoded image includes multiple encoded blocks and each encoded block is assigned with a first indication signal or a second indication signal. The decoding circuit is configured to perform a first decoding process on the encoded blocks assigned with the first indication signal to generate multiple first decoded blocks. The decoding circuit is also configured to perform a second decoding process different from the first decoding process on the encoded blocks assigned with the second indication signal to generate multiple second decoded blocks. The image processing circuit is configured to reconstruct an image information according to the first decoded blocks and the second decoded blocks.

Based on the above, the disclosure may skip the step of the dual gamma correction and perform specific encoding process for the edge block in the image. Further, the disclosure may perform different decoding processes on the blocks corresponding to different indication signals according to the indication signals corresponding to the encoded blocks, so as to perform specific decoding process on the pixel information of the encoded edge block. Through the above measures, the disclosure can prevent the edge constituted by the multiple edge pixels in the display screen from disappearing due to the dual gamma correction and can skip the unnecessary mapping process for the edge block, so as to improve the efficiency of encoding and decoding and reduce the situation of distortion during the encoding and decoding processes.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure

DETAILED DESCRIPTION OF DISCLOSED EMBODIMENTS

Figure 1A:
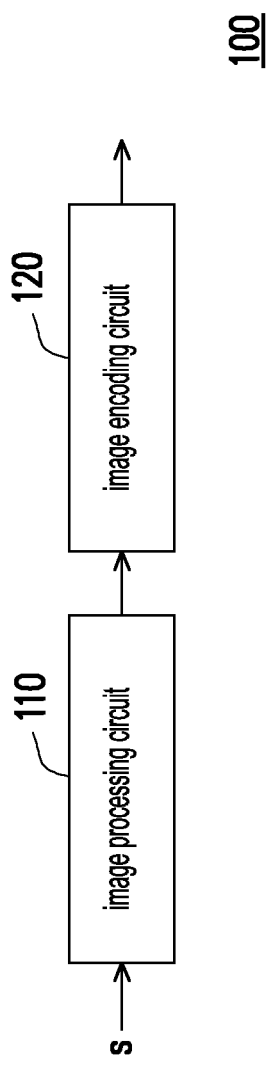
FIG. 1A is a schematic view of an image processing device according to an embodiment of the disclosure.

FIG. 1A is a schematic view of an image processing device according to an embodiment of the disclosure. Referring to FIG. 1A, an image processing device 100 includes an image processing circuit 110 and an encoding circuit 120. The image processing circuit 110 is configured to receive an image information of an image, wherein the image comprises a plurality of blocks and the image information comprises a plurality of pixel information of each block. The image processing circuit 110 is further configured to perform a dual gamma correction on a first group of blocks of the image to obtain one or more corrected blocks and skip the dual gamma correction on a second group of blocks of the image to obtain a plurality of uncorrected blocks. The image encoding circuit 120 is coupled to the image processing circuit 110 and is configured to perform a first encoding process on the one or more corrected blocks to obtain a plurality of first encoded blocks. The image encoding circuit 120 is further configured to perform a second encoding process on the uncorrected blocks to obtain a plurality of second encoded blocks, wherein the second encoding process is different from the first encoding process. In some implementations, the blocks in a protected area are the second group of blocks and the rest of the blocks (i.e., the non-protected area) are the first group of blocks. If a block is regarded as protected area such as an edge block, an indication signal such as a flag is signaled and skip a dual gamma correction process for the block, and furthermore the flag is also checked to skip a first mapping process prior to a compression process for the block.

Figure 1B:
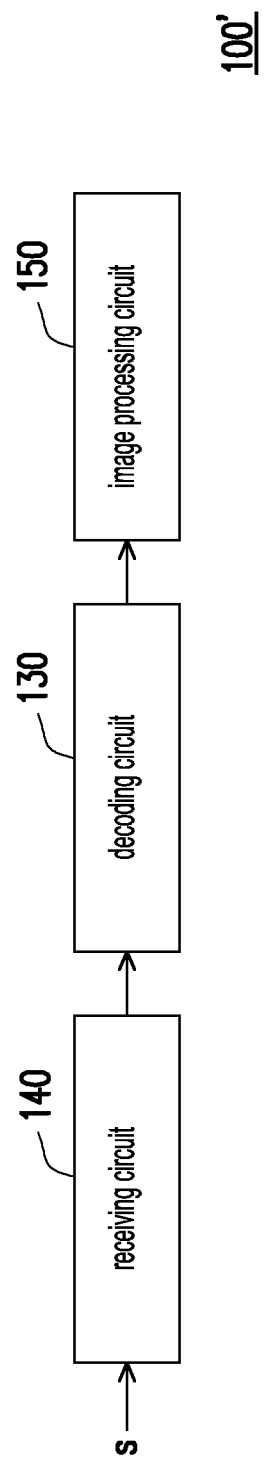
FIG. 1B is a schematic view of an image processing device according to an embodiment of the disclosure.

FIG. 1B is a schematic view of an image processing device according to an embodiment of the disclosure. Referring to FIG. 1B, an image processing device 110' includes a receiving circuit 140, a decoding circuit 130 and an image processing circuit 150. The receiving circuit 140 is configured to receive an encoded image information, wherein the encoded image comprises a plurality of aforementioned encoded blocks and each of the encoded blocks is assigned with a first indication signal (for e.g., a flag value is "1") or a second indication signal (for e.g., the flag value is "0"). The decoding circuit 130 is coupled to the receiving circuit 140 and is configured to perform a first decoding process on the encoded blocks assigned with the first indication signal to generate a plurality of first decoded blocks. The decoding circuit 130 is further configured to perform a second decoding process on the encoded blocks assigned with the second indication signal to generate a plurality of second decoded blocks, wherein the second decoding process is different from the first decoding process. The image processing circuit 150 is coupled to the decoding circuit 130 and is configured to reconstruct an image information according to the first decoded blocks and the second decoded blocks. In some implementations, the flag, which has been generated by an encoder and assigned with the encoded image information to be provided to the decoder, is checked to skip a second mapping process prior to a decompression process for the block. The second mapping process may be an inverse operation of the first mapping process performed by the image encoding circuit 120.

Figure 1C:
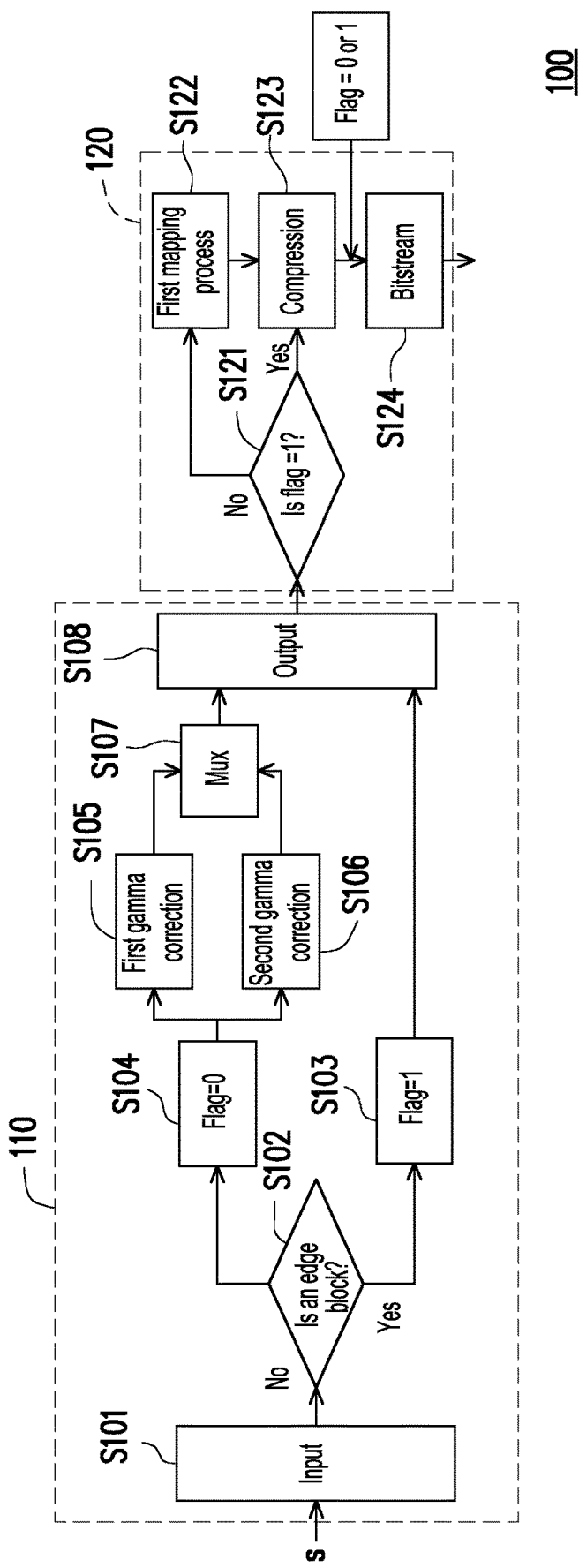
FIG. 1C is a schematic view of an operational flowchart corresponding to FIG. 1A according to an embodiment.

FIG. 1C is a schematic view of an operational flowchart corresponding to FIG. 1A according to an embodiment. In the embodiment, pixels in a protected area or an edge block may skip a dual gamma correction and a first mapping process before a compression process according to an indication signal. Referring to FIG. 1C, the image processing device 100 includes the image processing circuit 110 and the encoding circuit 120, wherein the image processing circuit 110 may include a dual gamma correction circuit (not shown). The image processing circuit 110 is configured to execute Steps S101 to S108. In Step S101, the image processing circuit 110 receives the image information of an image, wherein the image may be divided into multiple blocks and the image information includes multiple pixel information of each block. In Step S102, the image processing circuit 110 may determine whether each block is a protected area such as an edge block according to the multiple pixel information of each block. If yes, the image processing circuit 110 assigns a first indication signal for the block, for example, a flag with a value of 1 is assigned (Step S103). If not, the image processing circuit 110 assigns a second indication signal for the block, for example, a flag with a value of 0 (Step S104).

Generally speaking, a block with a significant change in pixel value neighboring blocks) may be defined as an edge block and the rest of the blocks may be defined as smooth blocks. There is a variety of conventional edge detection methods, which are well known to persons skilled in the art, so there will be no reiteration here. It should be noted that the indication signal is assigned for a block. In other words, each block will be assigned with an indication signal. In the embodiment, a block may include 4*8 pixels, but the size of the block is not limited thereto. In other embodiments, a block may also include 4*4 pixels, even 8*8 pixels.

For the pixels in the block assigned with the second indication signal (flag=0), the image processing circuit 110 may enable subpixel information of multiple subpixels of each pixel to be processed by the dual gamma correction circuit. The dual gamma correction circuit may perform different gamma corrections such as a first gamma correction and a second gamma correction, by referring to a plurality of gamma curves such as a high gamma curve and a low gamma curve, respectively. Various methods can be adopted to perform the dual gamma correction process according to design requirements. The dual gamma correction process may increase the viewable angle at side view. One of a plurality of gamma tables can be selected for each subpixel/pixel in the block. Adjacent processing units can be processed by different gamma tables, and different sizes of processed units can be arranged, such as one subpixel, two subpixel sand a pixel according to design requirements. For example, in the embodiment, all the pixel information of the subpixels in the pixel go through the first gamma correction and the second gamma correction (Steps S105 and S106) if flag=0. In Step S107, a multiplexer receives the subpixel information with the first gamma correction and the subpixel information with the second gamma correction to select and output one of the subpixel information with the first gamma correction and the subpixel information with the second gamma correction according to a subpixel relative position (spatial domain). The output of the multiplexer can be provided to the encoding circuit 120 through an output circuit (Step S108).

In another embodiment of the dual gamma correction process, the image processing circuit 110 may determine whether the subpixel goes through the first gamma correction or the second gamma correction according to the subpixel position. In addition, the image processing circuit 110 provides the correction result to the encoding circuit 120 through the output circuit (Step S108). Conversely, for the pixels in the block assigned with the first indication signal (flag=1), the image processing circuit 110 may directly output the subpixel information of multiple subpixels of each pixel to the encoding circuit 120 through the output circuit (Step S108). In other words, the subpixel information of the subpixels of the pixel in the block assigned with the first indication signal (flag=1) do not go through (i.e., skip) the step of dual gamma correction and can be directly outputted by the image processing circuit 110. Due to skipping the dual gamma correction, the edge constituted by the edge blocks can be prevented from disappearing caused by the dual gamma correction.

The encoding circuit 120 is configured to execute Steps S121 to S124. In Step S121, the encoding circuit 120 may receive each subpixel information with or without dual gamma correction and determine whether the input information is required to go through a first mapping process according to the indication signal (flag=1 or 0) of the block to which each pixel belongs. In the case where the indication signal of the block to which each pixel belongs is the second indication signal (flag=0), the input subpixel information is required to go through the first mapping process (Step S122) to gather the pixel information with similar characteristics for a compression process (Step S123). The definitions of "pixel information with similar characteristics" and "first mapping process" will be mentioned in the following embodiments, so no description will be made here.

In contrast, in the case where the indication signal of the block to which each pixel belongs is the first indication signal (flag=1), the input subpixel information is not required to go through (skip) the first mapping process and it can directly undergo the compression process (Step S123).

It is noted that in the case where flag=0, the first mapping process exists associated with the dual gamma correction. In addition, the first mapping process can gather the pixel information with similar characteristics before performing the compression process, so as to improve the compression efficiency. However, in the case where flag=0, the subpixel information of multiple subpixels of the pixel in the edge block did not go through the dual gamma correction and the pixel characteristics in the edge block are similar, so it is not necessary to go through the first mapping process before the compression process.

Finally, in Step S124, the encoding circuit 120 outputs the compressed pixel information (with the indication signal, that is, flag=0 or 1) in a bitstream manner for decoding.

Figure 1D:
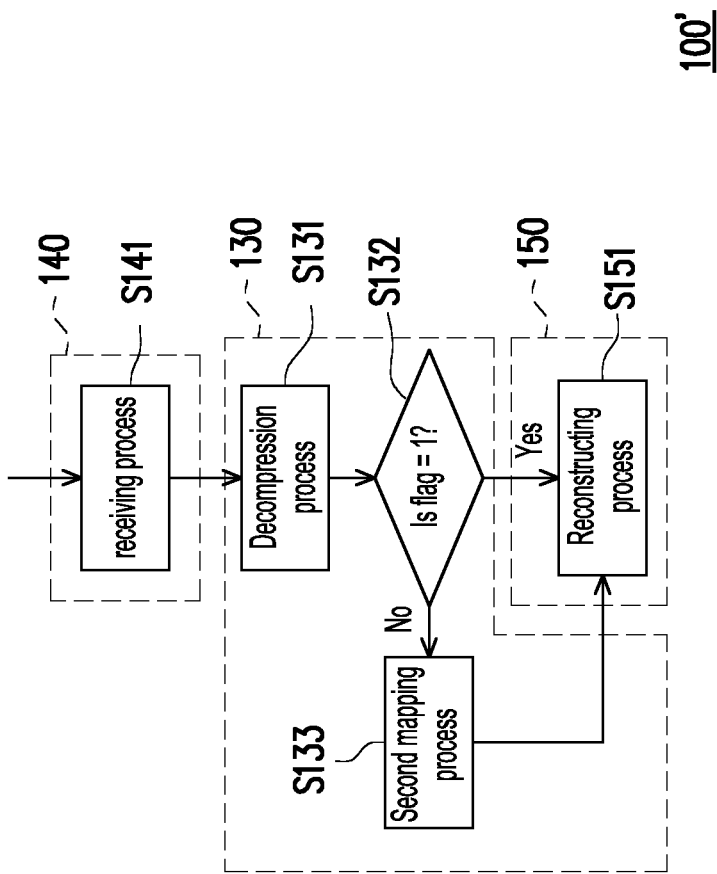
FIG. 1D is a schematic view of an operational flowchart corresponding to FIG. 1B according to an embodiment.

FIG. 1D is a schematic view of an operational flowchart corresponding to FIG. 1B according to an embodiment. Referring to FIG. 1D, the receiving circuit 140 is configured to execute Step S141. In Step S141, the receiving circuit 140 performs a receiving process to receive an encoded image information of an encoded image (ie. the compressed pixel information). The decoding circuit 130 is configured to execute Steps S131 to S133. In Step S131, the decoding circuit 130 performs a decompression process on the compressed pixel information. The decoding circuit 130 determines whether the decompressed pixel information is required to go through a second mapping process (Step S132) according to the indication signal (flag=1 or 0). The second mapping process can be a remapping or inverse process of the first mapping process and is configured to rearrange the positions of the pixels arranged by the first mapping process back to the original positions. In the case where the indication signal of the block to which each pixel belongs is the second indication signal (flag=0), the decompressed pixel information is required to go through the second mapping process (Step S133).

In contrast, in the case where the indication signal of the block to which each pixel belongs is the first indication signal (flag=1), the decompressed pixel information is not required to go through (skip) the second mapping process (Step S133). It should be noted that the second mapping process exists as an inverse operation of the first mapping process, which means that the second mapping process can rearrange the pixel information back to the original position. However, the subpixel information of multiple subpixels of the pixel in the edge block did not go through the first mapping process, so there is no need to go through the corresponding second mapping process. In the embodiment, the edge block of the image may skip the processing of the dual-gamma correction, the first mapping process, and the second mapping process according to the indication signal. The image processing circuit 150 is configured to execute Step S151. In Step S151, The image processing circuit 150 is configured to reconstruct an image information of the decompressed pixel information (with or without going through the second mapping process).

The mode of the block after the dual gamma correction and the operational procedure of the first mapping process will be described in the following embodiments.

Figure 2A:
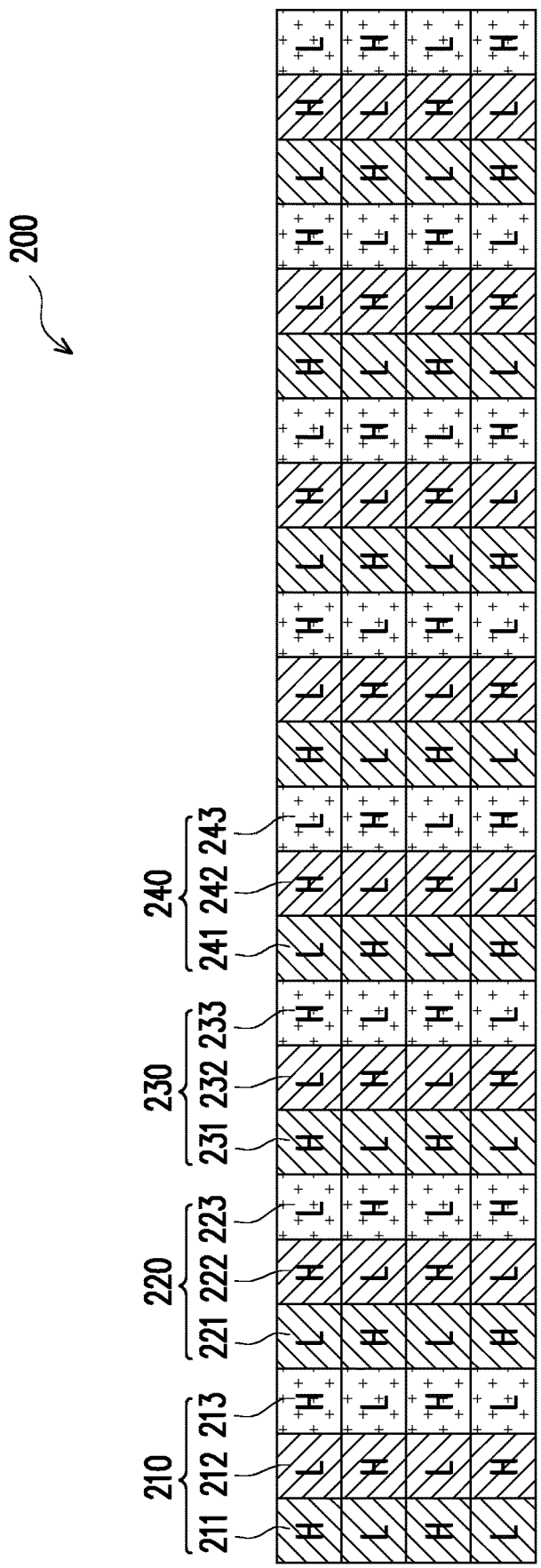
FIG. 2A is a schematic view of a block after a dual gamma correction according to a first embodiment of the disclosure.

FIG. 2A is a schematic view of a block after a dual gamma correction according to a first embodiment of the disclosure. Please refer to FIG. 2A. In the embodiment, a block 200 includes 4*8 pixels. The following will be described with pixels 210 to 240. The pixel 210 includes subpixels 211 to 213, which respectively include subpixel information corresponding to RGB. The subpixel information of the subpixels 211 and 213 are corrected by a high gamma curve (denoted as "H" in FIG. 2A) and the subpixel information of the subpixel 212 is corrected by a low gamma curve (denoted as "L" in FIG. 2A).

The pixel 220 includes subpixels 221 to 223, which respectively include subpixel information corresponding to RGB. The subpixel information of the subpixels 221 and 223 are corrected by a low gamma curve (L) and the subpixel information of the subpixel 222 is corrected by a high gamma curve (H). Therefore, in FIG. 2A, the pixels 210 and 220 are respectively represented as "HLH" and "LHL". Similarly, subpixels 231 to 233 in the pixel 230 are represented as "HLH" and subpixels 241 to 243 in the pixel 240 are represented as "LHL". It can be seen from FIG. 2A that any two adjacent subpixels in the block 200 must be "LH" or "HL". In terms of pixels, any pixel in the block 200 is either "HLH" or "LHL". Various methods can be adopted to perform the dual gamma correction process according to design requirements. The dual gamma correction process may increase the viewable angle at side view. One of a plurality of gamma tables can be selected for each subpixel/pixel in the block. Adjacent processing units can be processed by different gamma tables, and different sizes of processed units can be arranged, such as one subpixel, two subpixel sand a pixel according to design requirements.

Figure 2B:
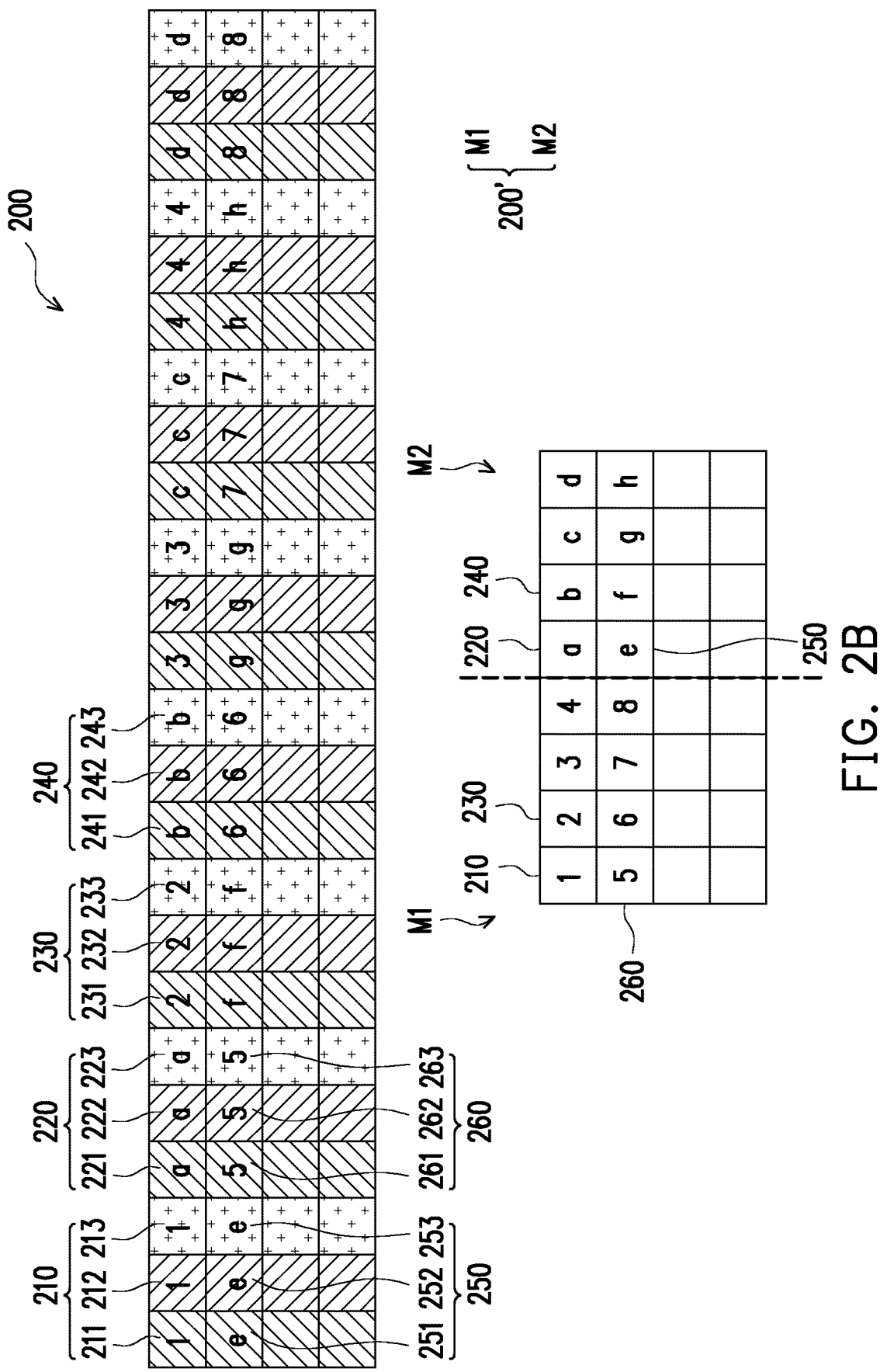
FIG. 2B is a schematic view of a block after a first mapping process according to a first embodiment of the disclosure corresponding to the dual gamma correction of FIG. 2A.

FIG. 2B is a schematic view of a block after a first mapping process according to a first embodiment of the disclosure. The first mapping process corresponds to the dual gamma correction of the embodiment shown in FIG. 2A. The first mapping process can gather the pixel information with similar characteristics before performing the compression process, so as to improve the compression efficiency. Referring to FIG. 2B, the block 200 includes multiple pixels including pixels 210 to 260. Each pixel includes three subpixels, such as subpixels 301 to 303 of the pixel 210, subpixels 221 to 223 of the pixel 220, subpixels 231 to 233 of the pixel 230, subpixels 241 to 243 of the pixel 240, subpixels 251 to 253 of the pixel 250, and subpixels 261 to 263 of the pixel 260. Reference may be made to the embodiment shown in FIG. 2A for the description of the block 200, which will not be reiterated here.

In addition, to facilitate representation of the position of each pixel before and after the first mapping process is performed, FIG. 2B respectively represents the subpixels in two adjacent pixels by numbers and lowercase letters. Therefore, the pixels 210, 230, and 260 are respectively represented by "111", "222", and "555", and the pixels 220, 240, and 250 are respectively represented by "aaa", "bbb", and "eee". The representation of the rest of the numbers and the lowercase letters may be deduced by analogy. In short, whether it is viewed in the pixel column direction or the pixel row direction, a pixel represented by a number and a pixel represented by a lowercase letter are alternated with each other.

Please refer to FIG. 2A and FIG. 2B at the same time. The characteristics of the pixel information of the pixels 210, 230, and 260 are similar (all "HLH") and the characteristics of the pixel information of the pixels 220, 240, and 250 are similar (all "LHL"). In the first mapping process, pixels with "HLH" characteristics are placed on a left half M1 of the block (including 4*4 pixels) and pixels with "LHL" characteristics are placed on a right half M2 of the block (including 4*4 pixels). In the left half M1 and the right half M2 of the block, a pixel is represented by a single number or a single lowercase letter. For example, the pixels 210, 230, and 260 are respectively represented by "1", "2", and "5", and the pixels 220, 240, and 250 are respectively represented by "a", "b", and "e". It can be seen from FIG. 3 that the first mapping process puts pixels with similar characteristics together to improve the compression efficiency of the subsequent compression process and reduce the degree of distortion. The block 200 is processed by the first mapping process to form a block 200'.

In the embodiment, the block 200 (including 4*8 pixels) may generate the left half M1 with a size of 4*4 and the right half M2 with a size of 4*4 after the first mapping process. However, the disclosure is not limited thereto. In other embodiments, the size of the block 200 may also be 4*4 and the block 200 may generate the left half M1 with a size of 4*2 and the right half M2 with a size of 4*2 after the first mapping process. In other words, the designer may define the block size according to actual requirements. In addition, in the subsequent compression process according to the embodiment, the pixel information of the left half M1 of the block 200' may be compressed first before compressing the pixel information of the right half M2 to improve the compression efficiency. However, in other embodiments, the pixel information of the right half M2 of the block 200' may be compressed first before compressing the pixel information of the left half M1.

Figure 3A:
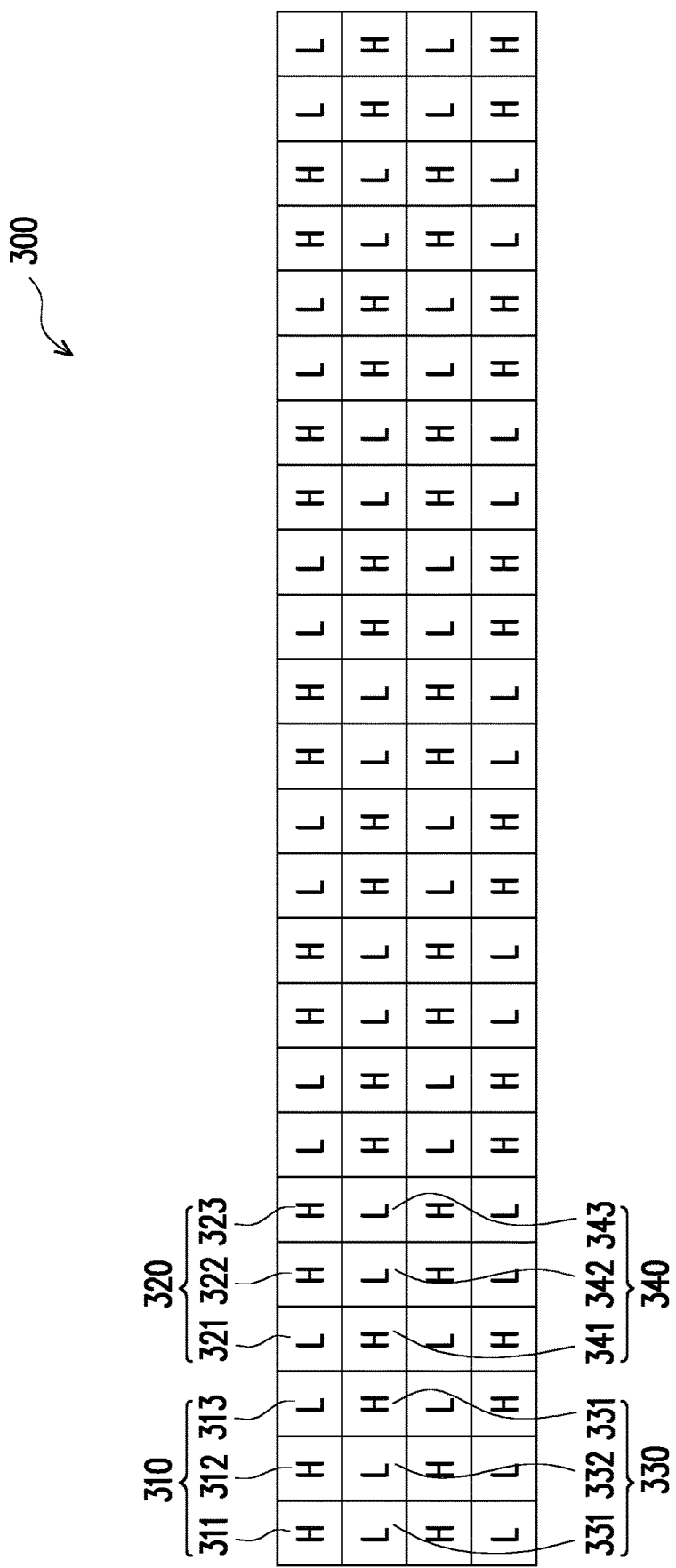
FIG. 3A is a schematic view of a block after a dual gamma correction according to a second embodiment of the disclosure.

FIG. 3A is a schematic view of a block after a dual gamma correction according to a second embodiment of the disclosure. Please refer to FIG. 3A. In a block 300, subpixels 311 to 313 of a pixel 310 are respectively represented by "H", "H", and "L", and subpixels 321 to 323 of a pixel 320 are respectively represented by "L", "H", and "H". Subpixels 331 to 333 of a pixel 330 are respectively represented by "L", "L", and "H", and subpixels 341 to 343 of a pixel 340 are respectively represented by "H", "L", and "L". In other words, in the pixel column direction, multiple subpixels are arranged in the manner of "HHLLHH . . . " or "LLHHLL . . . ", that is, two subpixels are changed as a group. In the pixel row direction, multiple subpixels are changed in the manner of "HLHL" or "LHLH".

Figure 3B:
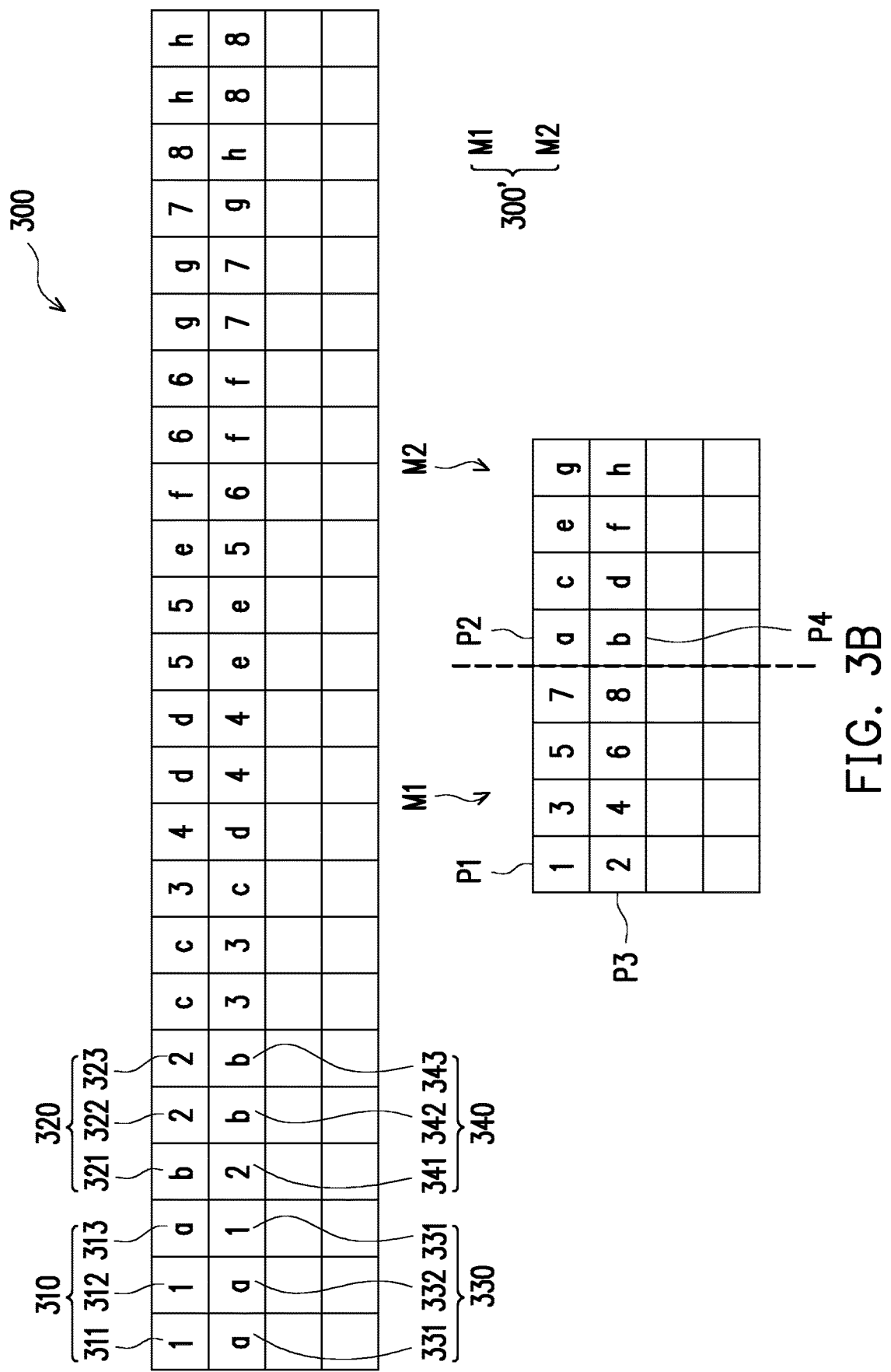
FIG. 3B is a schematic view of a block after a first mapping process according to a second embodiment of the disclosure corresponding to the dual gamma correction of FIG. 3A.

FIG. 3B is a schematic view of a block after a first mapping process according to the second embodiment of the disclosure. The first mapping process corresponds to the dual gamma correction of the embodiment shown in FIG. 3A. The first mapping process can gather the pixel information with similar characteristics before performing the compression process, so as to improve the compression efficiency. To facilitate representation of the position of each pixel before and after the first mapping process, FIG. 3B respectively represents the subpixels by numbers and lowercase letters. Please refer to FIG. 3A and FIG. 3B at the same time. Take two adjacent pixels in the pixel row direction as a group, the subpixels 311, 312, and 333 are marked as "H" (which represents correction by a high gamma curve), and the subpixels 313, 331, and 332 are marked as "L" (which represents correction by a low gamma curve). Therefore, in FIG. 3B, the subpixels 311, 312, and 333 are represented by "1" and the subpixels 313, 331, and 332 are represented by "a".

In the first mapping process, the subpixels 311, 312, and 333 with "H" characteristics are placed on a left half M1 of the block and the subpixels 313, 331, and 332 with "L" characteristics are placed on a right half M2 of the block. In other words, in a block 300' after the first mapping process, a pixel P1 located on the left half M1 is constituted by the subpixels 311, 312, and 333, and a pixel P2 located on the right half M2 is constituted by the subpixels 313, 331, and 332. Similarly, a pixel P3 located on the left half M1 is constituted by the subpixels 322, 323, and 341, and a pixel P4 located on the right half M2 is constituted by the subpixels 321, 342, and 343.

Figure 4A:
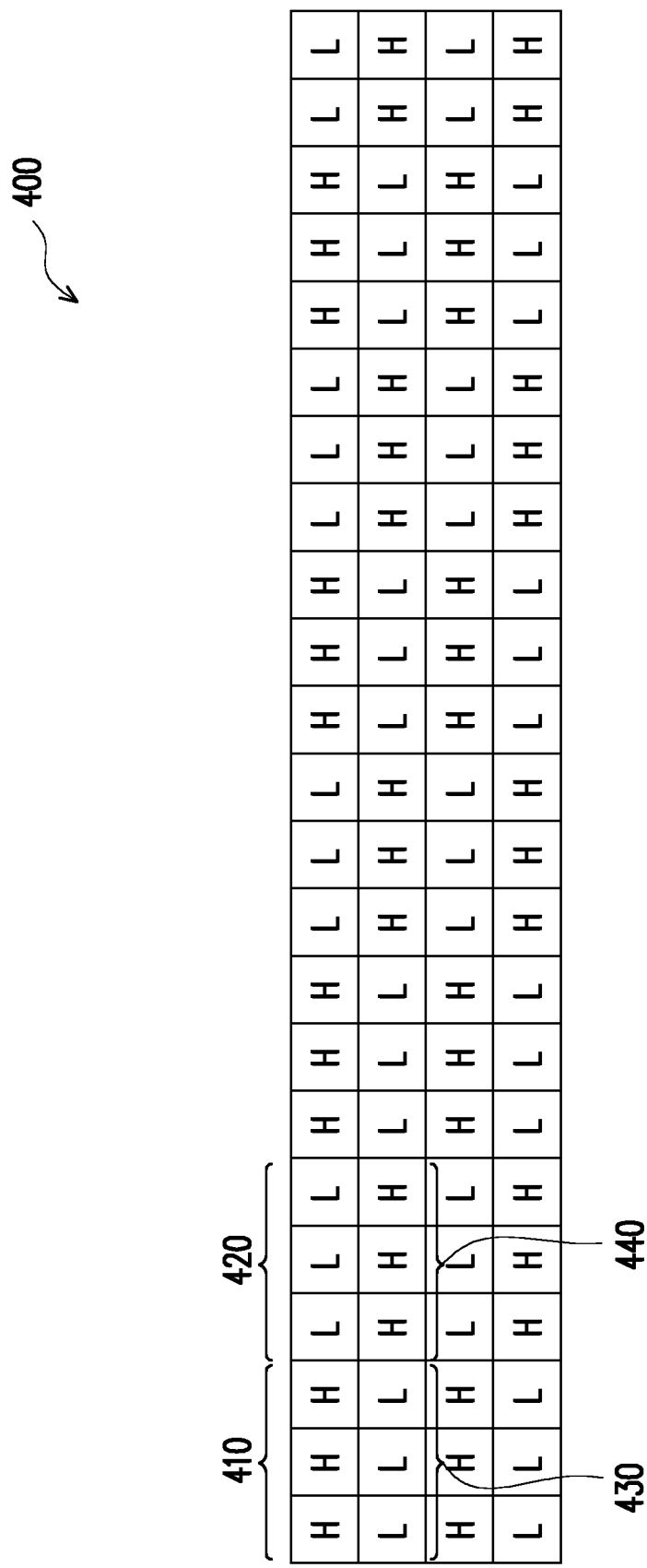
FIG. 4A is a schematic view of a block after a dual gamma correction according to a third embodiment of the disclosure.

FIG. 4A is a schematic view of a block after a dual gamma correction according to a third embodiment of the disclosure. Referring to FIG. 4A, in a block 400, subpixels of a pixel 410 are all "H", subpixels of a pixel 420 are all "L", subpixels of a pixel 430 are all "H", and subpixels of a pixel 440 are all "L". In other words, in the pixel column direction, multiple subpixels are arranged in the manner of "HHHLLLHHH . . . " or "LLLHHHLLL . . . ", that is, changes are performed in units of pixels. In the pixel row direction, multiple subpixels are changed in the manner of "HLHL" or "LHLH".

Figure 4B:
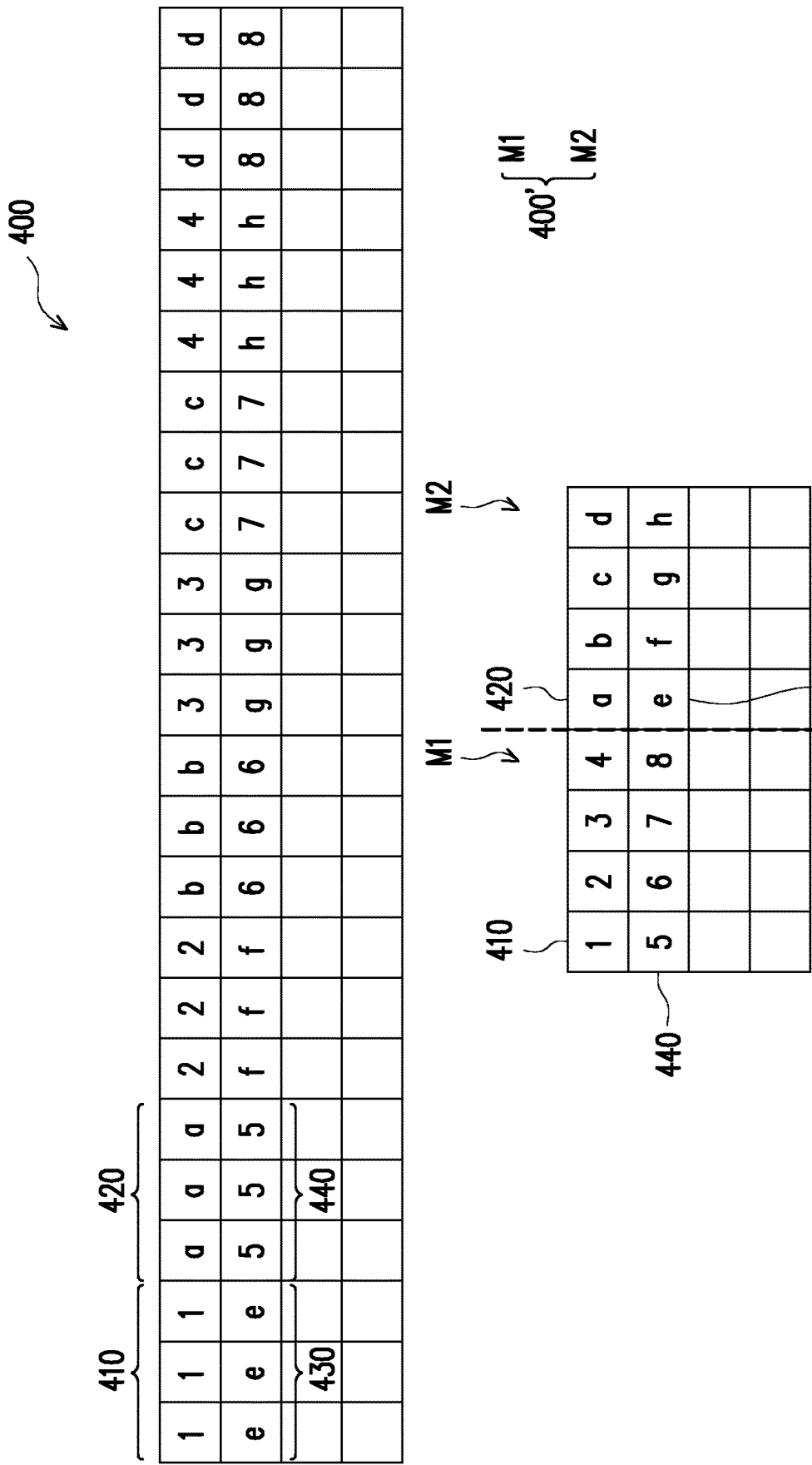
FIG. 4B is a schematic view of a block after a first mapping process according to a third embodiment of the disclosure corresponding to the dual gamma correction of FIG. 4A.

FIG. 4B is a schematic view of a block after a first mapping process according to a third embodiment of the disclosure. The first mapping process corresponds to the dual gamma correction of the embodiment shown in FIG. 4A. The first mapping process can gather the pixel information with similar characteristics before performing the compression process, so as to improve the compression efficiency. To facilitate representation the position of each pixel before and after the first mapping process, FIG. 4B respectively represents the subpixels by numbers and lowercase letters. Please refer to FIG. 4A and FIG. 4B at the same time. Taking two adjacent pixels in the pixel row direction as a group, pixels 410 and 440 are both "HHH" and pixels 420 and 430 are both "LLL". Therefore, in FIG. 4B, subpixels of the pixel 410 are represented by "1", subpixels of the pixel 420 are represented by "a", subpixels of the pixel 430 are represented by "e", and subpixels of the pixel 440 are represented by "5".

In the first mapping process, the pixels 410 and 440 with "H" characteristics (respectively represented by "1" and "5") are placed on a left half M1 of the block and the pixels 420 and 430 with "L" characteristics (respectively represented by "a" and "e") are placed on a right half M2 of the block. The left half M1 and the right half M2 constitute a block 400', which is the mapping result of the first mapping process. In the embodiments shown in FIG. 3 to FIG. 5, the objective of the second mapping process is to rearrange pixels (or subpixels) back to the original positions.

In summary, embodiments of the disclosure provide different identifications for a protected area such as the edge block and a non-protected area such as a non-edge block (smooth block) in the image, such that the edge block may skip the dual gamma correction, the first mapping process before a compression process, and the second mapping process before a decompression process. Reconstructed image quality would be improved because the edge texture is processed separately in compression As such, the pixel color in the edge block can be prevented from being disturbed, the compression efficiency can be improved, and the distortion caused by compression can be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing method, comprising:
   receiving an image information of an image, wherein the image comprises a plurality of blocks and the image information comprises a plurality of pixel information of each block;
   performing a dual gamma correction on a first group of blocks of the image to obtain one or more corrected blocks and skipping the dual gamma correction on a second group of blocks of the image to obtain a plurality of uncorrected blocks;
   performing a first encoding process on the one or more corrected blocks to obtain a plurality of first encoded blocks; and
   performing a second encoding process different from the first encoding process on the uncorrected blocks to obtain a plurality of second encoded blocks.

2. The image processing method as claimed in claim 1, further comprising:
   determining, for each of the blocks, whether the each of the blocks belongs to the first group or the second group according to the pixel information of the each of the blocks.

3. The image processing method as claimed in claim 2, wherein the first group of blocks are edge blocks and the second group of blocks are smooth blocks.

4. The image processing method as claimed in claim 1, further comprising:
   assigning a first indication signal to each of the first group of blocks and assigning a second indication signal to each of the second group of blocks; and
   determining whether to perform the dual gamma correction on each of the blocks according to an indication signal of the each of the blocks.

5. The image processing method as claimed in claim 4, further comprising:
   determining, for each of the corrected blocks and the uncorrected blocks, whether to perform the first encoding process or the second encoding process according to the indication signal of the each of the blocks.

6. The image processing method as claimed in claim 1, wherein each of the first encoding process and the second encoding process comprises a compression process.

7. The image processing method as claimed in claim 6, wherein the first encoding process further comprises a dual gamma mapping process before the compression process.

8. The image processing method as claimed in claim 6, wherein the second encoding process further skips a dual gamma remapping process before the compression process.

9. The image processing method as claimed in claim 1, further comprising:
   performing a first decoding process on the first encoded blocks; and
   performing a second decoding process different from the first decoding process on the second encoded blocks.

10. The image processing method as claimed in claim 9, wherein each of the first decoding process and the second decoding process comprises a decompression process.

11. The image processing method as claimed in claim 9, wherein the first decoding process further comprises a dual gamma mapping process after the compression process.

12. The image processing method as claimed in claim 9, wherein the second decoding process further skips a dual gamma remapping process after the decompression process.

13. The image processing method as claimed in claim 9, wherein a first indication signal has been assigned to each of the first group of blocks and a second indication signal has been assigned to each of the second group of blocks, the image processing method further comprising:
   determining whether to perform the first decoding process or the second decoding process according to an indication signal corresponding to each of the blocks in the first encoded blocks and the second encoded blocks.

14. An image processing device, comprising:
   an image processing circuit, configured to:
   receive an image information of an image, wherein the image comprises a plurality of blocks and the image information comprises a plurality of pixel information of each block; and
   perform a dual gamma correction on a first group of blocks of the image to obtain one or more corrected blocks and skip the dual gamma correction on a second group of blocks of the image to obtain a plurality of uncorrected blocks; and an image encoding circuit, configured to:

perform a first encoding process on the one or more corrected blocks to obtain a plurality of first encoded blocks; and perform a second encoding process different from the first encoding process on the uncorrected blocks to obtain a plurality of second encoded blocks.

15. The image processing device as claimed in claim 14, wherein the first encoding process comprises a dual gamma mapping process and a compression process after the dual gamma mapping process; and the second encoding process comprises a compression process and skips a dual gamma remapping process before the compression process.

\* \* \* \* \*